United States Patent [19]

Eve

[11] 4,047,370
[45] Sept. 13, 1977

[54] RAKE

[76] Inventor: Norman C. Eve, R.R. No. 2, New Albany, Ind. 47150

[21] Appl. No.: 694,314

[22] Filed: June 9, 1976

[51] Int. Cl.² .......................................... A01D 77/00
[52] U.S. Cl. ................................................... 56/377
[58] Field of Search ............... 56/365, 366, 376, 377; 171/63, 64, 84, 85; 172/540–544, 549

[56] References Cited

U.S. PATENT DOCUMENTS

| | | | |
|---|---|---|---|
| 2,683,345 | 7/1954 | Meyer | 56/377 |
| 2,966,773 | 1/1961 | van der Lely | 56/377 |
| 2,993,328 | 7/1961 | van der Lely et al. | 56/377 |
| 3,077,067 | 2/1963 | van der Lely | 56/377 |

Primary Examiner—Russell R. Kinsey
Attorney, Agent, or Firm—Wm. R. Price

[57] ABSTRACT

A rake is described which allows for adjustment between an ordinary lateral displacement working position and a medial delivery of materials. This is accomplished by providing a means whereby the main beam supporting the sets of raking wheels at each end is made into a two-piece beam which can be coupled into its standard rigid position or which can be pivoted forwardly relative to its direction of travel to change the angular disposition of the raking wheels relative to each other and thus change the delivery of materials from lateral to medial.

7 Claims, 5 Drawing Figures

RAKE

FIELD OF THE INVENTION

This invention relates to rakes for the lateral displacement of materials lying on the ground. More specifically, this invention relates to a modification of side delivery rakes which allows the working position to be changed so that materials on the ground may be displaced medially rather than laterally.

SUMMARY OF THE PRIOR ART

In recent years, a series of side-delivery raking devices have been placed on the market which involve the use of rotatably mounted wheels with ground engaging tines, disposed in such a manner as to displace material on the ground laterally into a windrow. Such devices have been developed, for example, by Cornelius van der Lely and others of the Netherlands as had been described in their U.S. Pat. Nos. 2,993,328; 3,077,067; 2,867,072; 2,994,180; and 3,006,132; 3,080,699; and 3,108,423. The apparatus, for example described in U.S. Pat. No. 2,993,328, has been marketed in this country under the trademark ACROBAT and is capable of three basic working positions. These include: raking in which each of the rake wheels act together to displace material to one side in a windrow; a second position in which the entire assembly is rotated through 180° on a substantially horizontal axis so that each rake wheel individually displaces material laterally, for fluffing to allow for speedy drying; and a third position which involves the rotation of the auxillary shafts 180° in a horizontal axis so that each set of rake wheels act together to produce two windrows in one operation. Because of the light-weight flexibility of the assembly consisting essentially of one main beam and two subsidiary beams each of which is rotatably around a horizontal axis of 180°, no ground support wheels are necessary and the apparatus can be easily and quickly transported from field to field merely by raising the entire mechanism through a tractor's three-point power hoist into an elevated position. As fully described in U.S. Pat. No. 2,993,328 and in literature associated with the sale of this machine, this structure offers flexibility of working positions and due to the quick release pins, these positions can be obtained in a matter of seconds without tools or other adjustments.

One problem, however, has been encountered with the use of this machine. This relates to the subsequent processing of the windrows with the modern balers which form a round cylindrical bale rather than a conventional square bale. The windrows formed by the device are not sufficiently large for one to make up a round bale. Therefore, it is necessary to plan the raking operation so as to attempt to place the windrows as close to each other as is possible. Nevertheless, it is essentially impossible to place the windrows in side-by-side relationship so that a baler can follow behind and pick up a uniform cylindrical bale. It therefore becomes necessary to allow for a medial delivery of materials from two adjacent windrows to a center position. This cannot be accomplished through the use of the device described in U.S. Pat. No. 2,993,328 since the planes of each of the rotatable wheels in any of the positions are generally parallel to each other. It is necessary therefore, in order to allow for medial delivery of two windrows into a central windrow to change the angular relationship of the wheels at each end of the beam so that projections from the planes of said wheels are not parallel but intersect each other. van der Lely accomplished this in one configuration in U.S. Pat. No. 3,077,067 through the use of a straight main beam with ground engaging wheels and with straight subsidiary beams supporting the rotatably mounted raking wheels. Each of said beams were adjustable to allow for either parallel or intersecting inter-relationship of the planes of both sets of the rotatably mounted raking wheels. This device, however, because of its construction, was relatively heavy and cumbersome and did not afford the light-weight flexibility of the ACROBAT apparatus described and claimed in U.S. Pat. No. 2,993,328. All of the other developments of van der Lely described in the patents previously mentioned, utilized the bent beams and subsidiary bent beams and thus allowed for more flexibility of the raking apparatus.

SUMMARY OF THE INVENTION

According to this invention, there is provided a means for changing the angular disposition of the raking wheels relative to each other from a generally parallel relation to an intersecting relation through the use of a two-piece main beam in which at least one of the main beam portions is bent. This can be utilized in conjunction with subsidiary bent beams such as are described in the U.S. Pat. No. 2,993,328. By provision of this simple two-piece construction, containing a coupling means for holding the main beam in a first fixed position, and a pivot means for pivoting the ends of the main beam forwardly in the direction of travel in a horizontal plane, it is possible to change the angular disposition of the planes of the wheels at either end of the beam so that projections from said planes intersect with each other and so that materials are medially fed by each of the wheels to a center windrow. This is accomplished without the loss of any of the three working positions previously proposed in U.S. Pat. No. 2,993,328 since the main beam is still rotatable around 180° axis as is taught in the U.S. Pat. No. 2,993,328 and each of the subsidiary beams are rotatable around the 180° axis as is taught in the same reference. What is accomplished, however, is the provision of a fourth working position in which two windrows can be raked together into one large or centrally disposed windrow of suitable size and positioning for baling into cylindrical type bale.

DESCRIPTION OF THE PREFERRED EMBODIMENT

Figure 1:
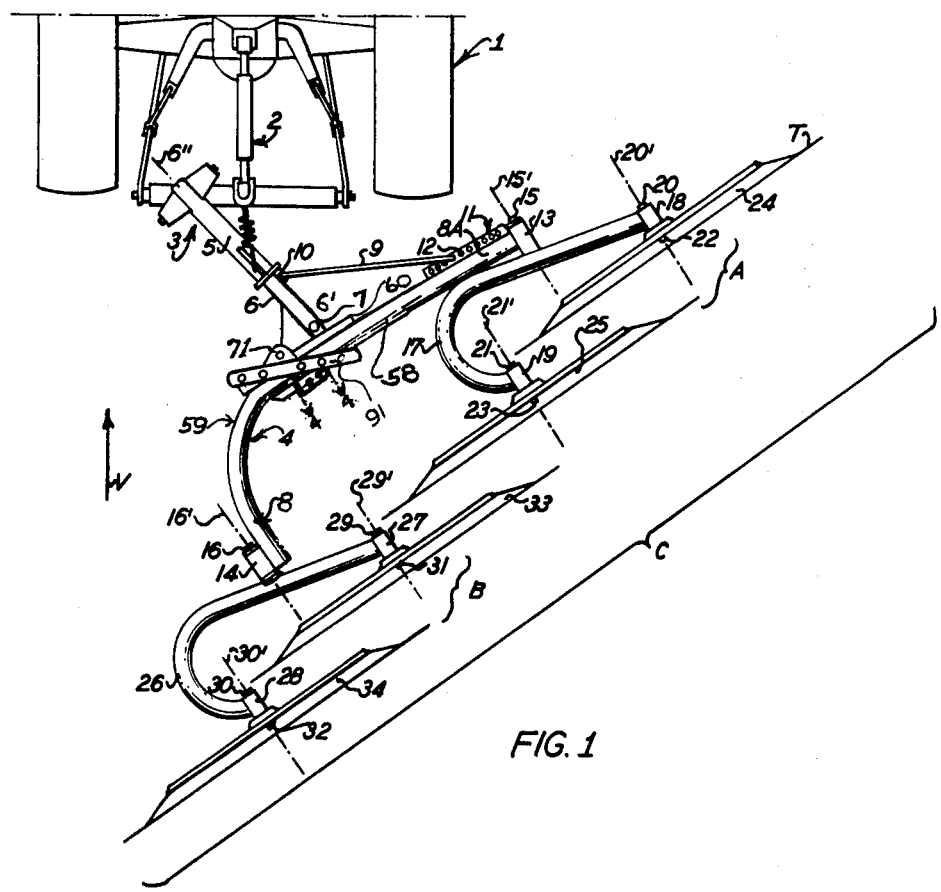
FIG. 1 is a plan view of a rake in a first working position as disclosed in U.S. Pat. No. 2,993,328 in which the rake wheels acting together displace material to the left side of the row of the rake wheels in a windrow.

Referring now to FIG. 1, a tractor 1 is provided having a conventional three-point power hoist 2 which supports the rake 4 by means of a coupling 3. The coupling 3, comprises the tube 5 which constitutes a bearing for a horizontal shaft 6. The rear end 6' of the horizontal shaft 6 supports a frame or beam 8 by means of a vertical pivot 7 in a conventional manner. The beam 8 according to this invention, is made up of two parts, a straight beam member, 58 and a bent beam member 59. The beam members 58 and 59 are held together in a first position by means of a coupling device comprising a channel 60 welded to the front surface of beam member 58 and channel member 70 welded to the front surface of beam member 59. Lugs 71 containing holes 72 are welded to the spaced flanges of channel member 70. A bolt sleeve 73 which acts as a bearing for bolt 74 is welded to the upper and lower flanges of channel 60. The bolt fitted through to the holes 72 of lugs 71 and through the bolt sleeve 73 acts as a pivot for the beam members 58 and 59. The beam members 58 and 59 are held in first locked position in abutting relationship forming a main central beam, by means of a locking device which in the illustration shown, consists of a clevis member 100, welded to the front part of beam member 58 and containing bolt holes 101. The clevis member is welded at point 102 to the beam member 58. A strap of steel 105 is welded at point 106 to the front portion of beam member 59 and has a projecting tongue 107 containing holes 108 which register with holes 101 of the clevis member 100 for provision of locking bolts 110. It is clear that by removal of locking bolts 110, the straight beam 58 and the bent beam member 59 may be pivoted forwardly in the direction of travel in a horizontal plane to the position shown in FIG. 2. This position is held in engagement by a locking member consisting of a bolt sleeve 80, welded to channel 70 and a front portion of bent beam member 59. A second sleeve 90 is welded to a rear portion of straight beam member 58. These two sleeves are connected together by upper and lower locking straps 91 containing holes 92 and 93. These holes, when registered with the sleeve members 80 and 90 respectively, are tied together by means of bolts 95 and 96 in the second position.

Figure 2:
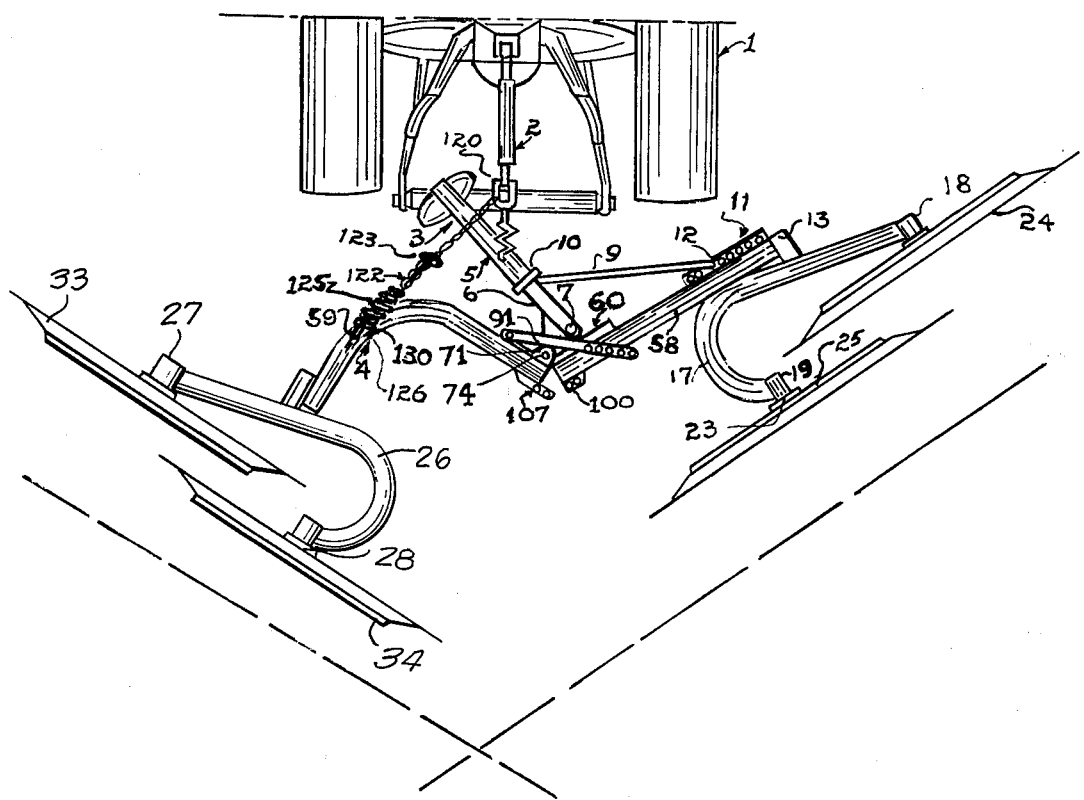
FIG. 2 is a plan view illustrating the working position afforded by the improvement of this invention wherein a projection of the angular disposition of the planes of the wheel assembly A intersects a projection of the angular disposition of the planes of wheel assembly B to allow for medial displacement of the material between wheel assembly A and wheel assembly B into a central windrow.
Figures 3, 4, 5:
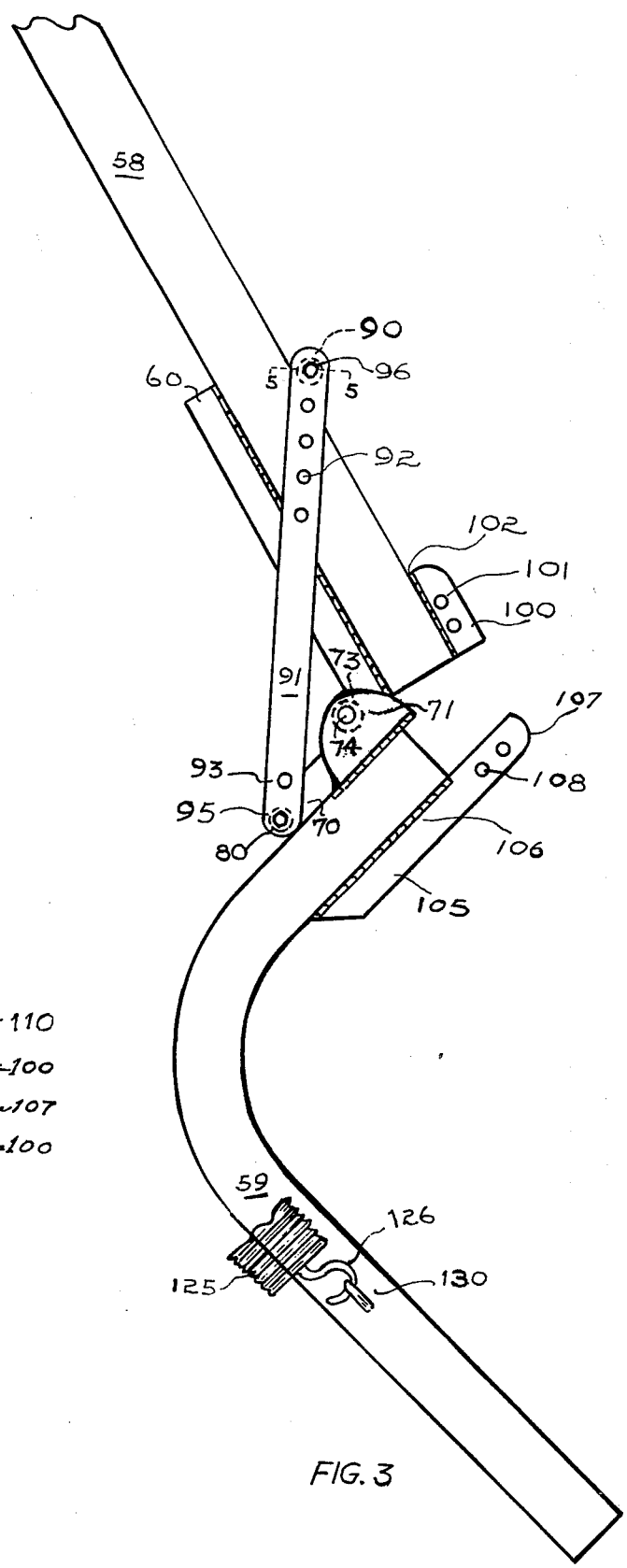
FIG. 3 is an enlarged fragmentary section of FIG. 2 showing the coupling and pivot means of this invention.
FIG. 4 is an enlarged sectional view taken along lines 4—4 of FIG. 1 illustrating the relationship of the clevis member and the tongue of the locking means for position shown in FIG. 1.
FIG. 5 is a sectional view taken along lines 5—5 of FIG. 3 illustrating the relationship of the sleeve in engagement with the upper and lower locking strips forming the locking means for the second position, shown in FIG. 2.

As previously mentioned, it will be noted that in the position shown in FIG. 1, the rake wheels 24 and 25 forming assembly A and the rake wheels 33 and 34 forming assembly B are generally parallel to each other. However, when the beam members 58, 59 are moved relative to each other, mainly, by moving beam member 59 forwardly in a horizontal plane about pivot means 73, 74, and locked into position as shown in FIG. 2, projections from the planes of rake wheels 24 and 25 forming assembly A intersect with projections from the planes of rake wheels 30 and 34 forming assembly B. In this manner, two windrows can be medially delivered forming a central windrow of sufficient size and uniformity to allow for the making of a perfect round bale with modern baling equipment.

As has previously been mentioned, in U.S. Pat. No. 2,993,328, the support sleeves, 13 and 14 at the end of 58 and 59 of beam members respectively, support shafts 15 and 16 which in turn support the secondary bent beams 26 and 17. Beam 26 contains sleeves 27 and 28 at each end which in turn contain shafts 29 and 30 which have subaxles 31 and 32 for rake wheels 33 and 34 respectively. These form assembly B of the rake wheels. As set out in the van der Lely patent, the main beam 8 may be rotated 180° around its horizontal axis so as to dispose the rake wheels 24 and 25 and 33 and 34 into a position where each acts independently to fluff the hay for fast drying of hay. Alternately, as previously set forth in the van der Lely patent, each of the secondary beams 26 and 17 may be rotated horizontally 180° to provide still different working positions.

By the provision of the two-piece main beam 8 in the form of straight beam member 58 and bent beam member 59, along with the coupling, pivot and locking means, of this invention, there is provided a means whereby the planes of the sets of rake wheels forming assembly A may be made to intersect with the planes of the wheel assembly B and thus provide for medial delivery of hay into a centrally disposed windrow.

It is essential when the apparatus is placed into the second position, that the rake wheels 33 and 34 of wheel assembly B be reversed on their axles 31 and 32 so as to rotate in the right direction. Further, in order to fully equalize the weight, there is provided a tensioning means. This is provided by drilling a hole in the vertical post 120 of the 3 point hitch, to which a clevis member 121 is attached for provision of chain 122. The chain has a connecting loop 123 which is used for fastening with a bent rod 124 onto which spring 125 is connected by means of hook 126. The free hook 126 of the other end of spring 125 is utilized to connect to eye 130 on bent beam member 59. This allows for equalization of tension during the use of the mechanism in the second position.

It will be apparent to those skilled in the art that an apparatus has been provided which allows for quick and easy arrangement in the field for maximum flexibility of an already flexible raking instrument. The lightweight ACROBAT consisting essentially of a bent main beam 8 and bent subsidiary beams 17 and 26, has, by the provision of the apparatus of this invention, made possible the change of angular relationship of the planes of the raking wheel assembly A and B from parallel to intersecting and thus allow for both medial and lateral displacement of materials on the ground as desired.

Many modifications will occur to those skilled in the art from the detailed description hereinabove given which is meant to be exemplary in nature except so as to be commensurate in scope with the appended claims.

I claim:

1. A rake adapted for either lateral or medial displacement of material lying upon the ground, said rake having a predetermined direction of travel and including:
   A. a frame having a substantially rigid main beam and
   B. a plurality of rake wheels, each having ground engaging tines and being rotatably mounted toward each end of said main beam in operative relation with said frame, the planes of said wheels being generally parallel to each other and being angularly disposed so as to define an acute angle in relation to said direction of travel;
   C. the improvement for the variable adjustment of the planes of said wheels on each end of said beam from a parallel relation to an intersecting relation relative to each other for the medial displacement of material coming into engagement with said ground engaging tines, which comprises, in combination
1. first and second elongated beam members, in which at least one of said beam members is bent along its longitudinal axis,
2. coupling means for coupling said elongated beam members together in end to end relation in a first fixed position to form the rigid main beam,
3. pivot means associated with said coupling means for pivoting said main beam members relative to each other in a horizontal plane in the intended direction of travel of said rake to a second fixed position and to change the relationship of the planes of said rake wheels at one end of said beam from a parallel to intersecting relationship, relative to the planes of said rake wheels at the other end of said beam, and,
4. locking means for locking said beam sections in either said first or in said second position.

2. A rake, as defined in claim 1, in which said coupling means comprises;
  A. channel members fixedly attached to the outer surface of each of said beam members in abutting relationship with each other,
  B. bearing means fixedly attached to one channel member and lug members fixedly attached to the other of said channel members and lying in overlapping relationship with the other of said channel members, and said bearing means said lug members containing bolt holes which register with the aperture in said bearing means,
  C. bolt means trying said lugs and said channel members together.

3. A rake, as defined in claim 1, in which said pivot means comprises
  A. a sleeve member permanently attached a forward portion of one of said beam members,
  B. a pair of lugs fixedly attached to the other of said elongated beam members, but overlapping said sleeve member and having bolt holes in registry therewith,
  C. bolt means extending through said lug and through said sleeve to serve as a pivot for said beam members.

4. A rake, as defined in claim 1, which said coupling and pivot means comprises
  A. channel members attached to a forward portion of each of said beam members,
  B. a sleeve welded to the upper and lower projecting flanges of one of said channel members,
  C. lugs welded to the upper and lower projecting flanges of the other of said channel members and having holes which register with the said bolt sleeve and
  D. a fitted through the hole of the upper and lower lugs and through said bolt sleeve; and
  E. means on the other side of said beam members for detachably securing said beam members together.

5. A rake, as defined in claim 1, in which said locking means for said first position comprises
  A. a clevis member permanently attached to a rearward portion of one of said beam members,
  B. an engagement member comprising an elongated strap permanently attached to the other of said beam members and having a projecting tongue detachably fitted between the upper and lower members of said clevis member,
  C. holes in the upper and lower members of said clevis member and
  D. a hole in said projecting tongue which registers with the holes in said clevis member, and
  E. bolts for securing said clevis member and said tongue member together.

6. A rake, as defined in claim 1, in which said locking means comprises:
  A. two upper and lower metal straps, having holes that register with each other,
  B. a first sleeve welded to one of said beam members,
  C. a second sleeve welded to the other of said beam members,
  D. bolts registering with the holes in said upper and lower straps and with the said sleeves for bolting said beam members into fixed engagement.

7. A rake, as defined in claim 1, the further combination therewith of a tension means attached to said tractor and to said rake for equalizing the weight of the frame when pivoted into its second position, which comprises,
  A. anchoring means for attachment to said tractor forward of said main beam,
  B. spring means in operative relation with said anchoring means; and
  C. an eye in one of said beam members for attachment with the free end of said spring.

* * * * *